(12) United States Patent
Mitsutani

(10) Patent No.: US 10,189,358 B2
(45) Date of Patent: Jan. 29, 2019

(54) POWER SUPPLY DEVICE

(71) Applicant: TOYOTA JIDOSHA KABUSHIKI KAISHA, Toyota-shi, Aichi-ken (JP)

(72) Inventor: Noritake Mitsutani, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 110 days.

(21) Appl. No.: 15/342,429

(22) Filed: Nov. 3, 2016

(65) Prior Publication Data

US 2017/0129350 A1 May 11, 2017

(30) Foreign Application Priority Data

Nov. 10, 2015 (JP) .................................. 2015-220451

(51) Int. Cl.
| | |
|---|---|
| B60L 11/18 | (2006.01) |
| B60L 11/08 | (2006.01) |
| H02M 3/158 | (2006.01) |
| H02M 7/44 | (2006.01) |
| B60L 11/12 | (2006.01) |
| B60L 11/14 | (2006.01) |

(52) U.S. Cl.
CPC ......... *B60L 11/1814* (2013.01); *B60L 11/08* (2013.01); *B60L 11/126* (2013.01); *B60L 11/14* (2013.01); *B60L 11/1851* (2013.01); *H02M 3/158* (2013.01); *H02M 3/1584* (2013.01); *H02M 7/44* (2013.01); *B60L 2210/30* (2013.01); *B60L 2240/525* (2013.01); *B60L 2240/526* (2013.01); *B60L 2240/529* (2013.01); *B60L 2240/547* (2013.01); *B60L 2240/549* (2013.01); *Y02T 10/7005* (2013.01); *Y02T 10/7077* (2013.01); *Y02T 10/7225* (2013.01); *Y02T 10/7241* (2013.01)

(58) Field of Classification Search
None
See application file for complete search history.

(56) References Cited

U.S. PATENT DOCUMENTS 9,895,980 B2 * 2/2018 Ishigaki .................. B60L 11/02

FOREIGN PATENT DOCUMENTS

| JP | 2011-097693 A | 5/2011 |
|---|---|---|
| JP | 2011-114918 | 6/2011 |
| JP | 2012-161215 A | 8/2012 |

* cited by examiner

*Primary Examiner* — Theinvu Tran
*Assistant Examiner* — David M Stables
(74) *Attorney, Agent, or Firm* — Finnegan, Henderson, Farabow, Garrett & Dunner, LLP

(57) ABSTRACT

An ECU performs a controlling process including: switching a main converter to a boost converter CNV2 when a boost converter CNV1 is set as a main converter and when a first stress value Va is greater than a second stress value Vb; switching a sub converter to the boost converter CNV1; switching the main converter to the boost converter CNV1 when the boost converter CNV1 is not set as a main converter, and when the second stress value Vb is greater than the first stress value Va; and switching the sub converter to the boost converter CNV2.

3 Claims, 7 Drawing Sheets

POWER SUPPLY DEVICE

This nonprovisional application is based on Japanese Patent Application No. 2015-220451 filed on Nov. 10, 2015, with the Japan Patent Office, the entire contents of which are hereby incorporated by reference.

BACKGROUND OF THE INVENTION

Field of the Invention

The present invention relates to control of a power supply device connected in parallel to an electric load and including a plurality of boost converters receiving electric power from a single power supply.

Description of the Background Art

Japanese Patent Laying-Open No. 2011-114918 discloses a power supply device connected in parallel to an electric load and including a plurality of boost converters that receive electric power from a single power supply.

SUMMARY OF THE INVENTION

For example, when two boost converters receiving electric power from a single power supply are provided, it is conceivable to use one of the boost converters to execute voltage control for boosting a voltage to a target voltage so as to prevent the current flowing through the electric load from exceeding a limit value. It is also conceivable to use the other one of the boost converters to execute power control for supplying electric power to the electric load while setting part of required power as target power. In this way, large electric power can be supplied to the electric load by means of voltage control while power load can be distributed between these two boost converters by means of power control. Accordingly, the current flowing through the boost converter can be suppressed from exceeding a limit value.

In the operation performed as described above, however, one of the boost converters that executes voltage control continuously operates when it boosts the voltage to a target voltage. Accordingly, the operation time period of the one boost converter may be lengthened as compared with the other boost converter that executes power control as required during the operation of the one boost converter. Consequently, stresses upon components and the like may be accumulated more in the one boost converter than in the other boost converter. Therefore, deterioration may occur earlier in the one boost converter than in the other boost converter.

An object of the present invention is to provide a power supply device capable of suppressing unbalanced deterioration among a plurality of boost converters.

A power supply device according to an aspect of the present invention includes: a first boost converter electrically connected to an electric load; a second boost converter electrically connected to the electric load and connected in parallel with the first boost converter to the electric load; a power storage device connected in common to the first boost converter and the second boost converter; and a controller configured to use the first boost converter to execute voltage control and to use the second boost converter to execute power control, the voltage control being executed for performing a voltage boosting operation such that a voltage to be applied to the electric load is set at a target voltage, and the power control being executed for, when required power required at least for the electric load cannot be supplied to the electric load from only a single boost converter executing the voltage control, supplying electric power to the electric load while setting part of the required power as the target power. The controller is configured to calculate a first stress value and a second stress value. The first stress value quantitatively shows a stress caused by the voltage boosting operation of the first boost converter and accumulated in a component included in the first boost converter. The second stress value quantitatively shows a stress caused by the voltage boosting operation of the second boost converter and accumulated in a component included in the second boost converter. The controller is configured to, when the first stress value is greater than the second stress value, use the second boost converter to execute the voltage control and use the first boost converter to execute the power control.

In this way, since the boost converter having a smaller stress value is used for voltage control, accumulation of stresses can be distributed between the first boost converter and the second boost converter. Consequently, it becomes possible to suppress deterioration from occurring earlier in one boost converter than in the other boost converter.

The power supply device is mounted on a vehicle. Each of the first stress value and the second stress value is calculated based on at least one of: the number of times of a sudden change in a temperature of a switching element during the voltage boosting operation; a duration time of the voltage boosting operation; a traveling distance of the vehicle during the voltage control; and the number of times of startup of the vehicle during the voltage control.

In this way, the first stress value and the second stress value each can be appropriately calculated.

The controller performs no switching from the voltage control using the first boost converter to the voltage control using the second boost converter when a magnitude of a difference between the first stress value and the second stress value is less than a threshold value even if the first stress value is greater than the second stress value.

In this way, it becomes possible to suppress frequent switching between the boost converter executing voltage control and the boost converter executing power control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
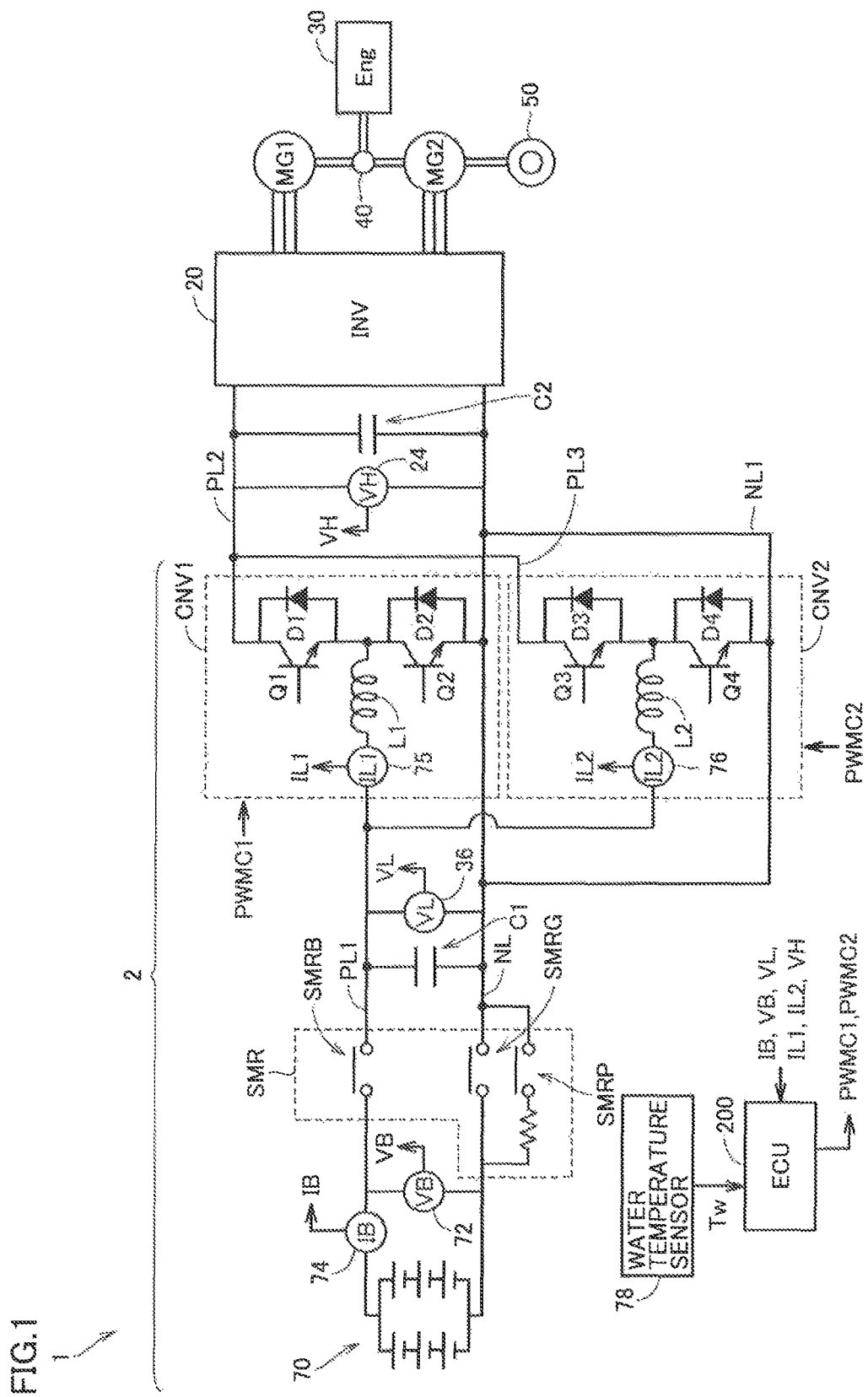
FIG. 1 is an entire configuration diagram of a hybrid vehicle equipped with a power supply device according to the first embodiment.

The embodiments of the present invention will be hereinafter described in detail with reference to the accompanying drawings, in which the same or corresponding components are designated by the same reference characters, and description thereof will not be basically repeated.

First Embodiment

FIG. 1 is an entire configuration diagram of a hybrid vehicle 1 (which will be hereinafter simply referred to as a vehicle 1) equipped with a power supply device 2 according to the first embodiment. Vehicle 1 includes motor generators MG1, MG2, boost converters CNV1, CNV2, a system main relay SMR, an inverter 20, an engine 30, a power split device 40, a driving wheel 50, a battery 70, and an ECU (Electronic Control Unit) 200. Power supply device 2 according to the present embodiment includes boost converters CNV1, CNV2, battery 70, and ECU 200.

Motor generators MG1, MG2 and engine 30 are coupled to power split device 40. Vehicle 1 travels with driving force from at least one of engine 30 and motor generator MG2.

An engine is, for example, an internal combustion engine such as a gasoline engine and a diesel engine. The motive power generated by engine 30 is divided by power split device 40 into a path through which the power is transmitted to driving wheel 50 and a path through which the power is transmitted to motor generator MG1.

Each of motor generators MG1 and MG2 is an alternating-current (AC) rotating electric machine, which is, for example, a three-phase AC rotating electric machine having a rotor in which a permanent magnet is incorporated. Motor generator MG1 generates electric power using the motive power from engine 30 that is divided by power split device 40. The AC power generated by motor generator MG1 is converted into DC power in inverter 20, and then supplied to battery 70 through boost converter CNV1 or boost converter CNV2.

Motor generator MG2 generates driving force using at least one of the electric power supplied from battery 70 and the electric power generated by motor generator MG1. Then, the driving force of motor generator MG2 is transmitted to driving wheel 50. In addition, during braking or the like of the vehicle, motor generator MG2 is driven by driving wheel 50, so that motor generator MG2 operates as a power generator. Thereby, motor generator MG2 operates as a regenerative brake that converts braking energy into electric power. The AC power generated by motor generator MG2 is converted into DC power in inverter 20, and then supplied to battery 70 through boost converter CNV1 or boost converter CNV2.

Power split device 40 is formed of a planetary gear mechanism including a sun gear, a pinion gear, a carrier, and a ring gear. The pinion gear engages with each of the sun gear and the ring gear. The carrier supports the pinion gear in a rotatable manner and is coupled to the crankshaft of engine 30. The sun gear is coupled to the rotation shaft of motor generator MG1. The ring gear is coupled to the rotation shaft of motor generator MG2 and the output shaft connected to driving wheel 50.

Battery 70 is, for example, a direct-current (DC) power supply that is formed of a secondary battery such as a nickel-metal hydride battery or a lithium ion battery. Battery 70 is configured, for example, by two parallel-connected battery cell groups each formed by a plurality of battery cells connected in series. Battery 70 is connected to each of boost converters CNV1 and CNV2 through system main relay SMR.

System main relay SMR includes a relay SMRB, a relay SMRP, and a relay SMRG. Relay SMRB, relay SMRP, and relay SMRG each are controlled to be opened and closed based on a signal from ECU 200.

Relay SMRB switches between connection and disconnection of the path between a positive electrode line PL1 and the positive electrode of battery 70. Relay SMRP switches between connection and disconnection of the path extending between a negative electrode line NL and the negative electrode of battery 70 through a resistor for pre-charging. Relay SMRG switches between connection and disconnection of the path extending between negative electrode line NL and the negative electrode of battery 70 but not extending through a resistor for pre-charging.

When relay SMRB and relay SMRG are closed, battery 70 is electrically connected to inverter 20.

A voltage sensor 72 and a current sensor 74 are arranged between battery 70 and system main relay SMR. Voltage sensor 72 detects a voltage VB across terminals of battery 70. Current sensor 74 detects a current IB that flows through battery 70. Each of these sensors outputs the detected results to ECU 200.

Capacitor C1 is connected in parallel with battery 70. Voltage VB on battery 70 is smoothed by capacitor C1 and supplied to boost converters CNV1 and CNV2.

Voltage sensor 36 detects a voltage across both ends of capacitor C1, that is, a voltage VL between positive electrode line PL1 and negative electrode line NL, and then, outputs a signal showing the detected result to ECU 200.

Each of boost converters CNV1 and CNV2 boosts the voltage between positive electrode line PL1 and negative electrode line NL based on the signal from ECU 200. Inverter 20 converts, into AC power, the DC power boosted by boost converters CNV1 and CNV2 based on the signal from ECU 200, and outputs the AC power to each of motor generators MG1 and MG2.

Boost converter CNV1 includes a reactor L1, switching elements Q1 and Q2, and diodes D1 and D2. Each of switching elements Q1, Q2 and switching elements Q3 and Q4 described later is an IGBT (Insulated Gate Bipolar Transistor) element, for example. Switching elements Q1 and Q2 are connected in series to each other between power line PL2 and power line NL each connecting boost converter CNV1 and inverter 20. Diodes D1 and D2 each are connected between the collector and the emitter of each of switching elements Q1 and Q2, respectively, so as to be arranged in anti-parallel with each other. Reactor L1 has one end connected to positive electrode line PL1 that is on the high electric-potential side of battery 70. Reactor L1 has the other end connected to an intermediate point between switching element Q1 and switching element Q2 (a connection point between the emitter of switching element Q1 and the collector of switching element Q2).

In response to a control signal PWMC1 in a PWM (Pulse Width Modulation) scheme for causing each of switching elements Q1 and Q2 to perform a switching operation, boost converter CNV1 boosts a voltage VB on battery 70 and supplies the boosted voltage to positive electrode line PL2 and negative electrode line NL. Also, in response to control signal PWMC1, boost converter CNV1 may lower a DC voltage on each of positive electrode line PL2 and negative electrode line NL supplied from inverter 20 for charging battery 70.

Boost converter CNV2 includes a reactor L2, switching elements Q3 and Q4, and diodes D3 and D4. Switching elements Q3 and Q4 are connected in series to each other between power line PL3 branched from power line PL2 and power line NL1 branched from power line NL. Diodes D3 and D4 each are connected between the collector and the emitter of each of switching elements Q3 and Q4, respectively, so as to be arranged in anti-parallel with each other. Reactor L2 has one end connected to positive electrode line PL1. Reactor L2 has the other end connected to an intermediate point between switching element Q3 and switching element Q4 (a connection point between the emitter of switching element Q3 and the collector of switching element Q4).

In response to a control signal PWMC2 in a PWM scheme for causing each of switching elements Q3 and Q4 to perform a switching operation, boost converter CNV2 boosts voltage VB on battery 70, and supplies the boosted voltage to a positive electrode line PL3 and negative electrode line NL1. Also, in response to control signal PWMC2, boost converter CNV2 may lower the DC voltage supplied from inverter 20 and flowing through each of positive electrode line PL3 and negative electrode line NL1 for charging battery 70. In the present embodiment, boost converters CNV1 and CNV2 are assumed to have the same capacity.

A current sensor 75 detects a current IL1 flowing through reactor L1, and outputs a signal showing the detected result to ECU 200. A current sensor 76 detects a current IL2 flowing through reactor L2, and outputs a signal showing the detected result to ECU 200.

Capacitor C2 is connected in parallel with each of boost converters CNV1 and CNV2. The DC voltage supplied from boost converter CNV1 or boost converter CNV2 is smoothed by capacitor C2, and then supplied to inverter 20.

Voltage sensor 24 detects the voltage across both ends of capacitor C2, that is, a voltage VH between positive electrode line PL2 and negative electrode line NL. Then, voltage sensor 24 outputs a signal showing the detected result to ECU 200.

When inverter 20 receives voltage VH from boost converters CNV1 and CNV2, this inverter 20 converts the DC voltage into an AC voltage based on a control signal PWMI to cause motor generators MG1 and MG2 to operate. Thereby, motor generators MG1 and MG2 are operated so as to generate a torque designated by their respective torque command values. Inverter 20 is formed of a plurality of switching elements (not shown) each performing a switching operation in response to control signal PWMI.

A water temperature sensor 78 is provided in a cooling device (not shown) configured to cool boost converters CNV1 and CNV2. In addition to boost converters CNV1 and CNV2, the cooling device may be configured to cool at least any of inverter 20 and motor generators MG1 and MG2. The cooling device includes a radiator, a water pump, and a cooling passage. Cooling water circulates through this cooling passage. The water pump is operated to cause the cooling water in the cooling passage to circulate through the radiator. Accordingly, heat of the cooling water is dissipated when it flows through the radiator. Water temperature sensor 78 detects a temperature of the cooling water circulating through the cooling passage (which will be hereinafter referred to as a cooling water temperature) Tw, and outputs the signal showing the detected result to ECU 200.

ECU 200 includes a CPU (Central Processing Unit) and a memory that are not shown. ECU 200 is configured so as to perform a prescribed computing process based on the map and the program stored in the memory.

In vehicle 1 having the configuration as described above, when voltage boosting is not required during driving of vehicle 1, ECU 200 brings both of boost converters CNV1 and CNV2 into a voltage boost stopped state. ECU 200 brings switching elements Q1 and Q3 into an ON state, and brings switching elements Q2 and Q4 into an OFF state. In this way, when each of switching elements Q1 to Q4 does not perform a switching operation, each of boost converters CNV1 and CNV2 is brought into a voltage boost stopped state.

In addition, for example, based on required power Pe required for vehicle 1, ECU 200 determines whether voltage boosting is required or not. ECU 200 calculates required power Pe required for vehicle 1 based on the depressed amount of an accelerator pedal, a vehicle speed, and the like. ECU 200 divides the calculated required power Pe by voltage VL, thereby estimating the magnitude of the current (Pe/VL) flowing through inverter 20 at the time when the voltage boosting operation is not performed. ECU 200 determines whether the estimated current is greater than a current limit value of inverter 20 or not. When the estimated current is greater than the current limit value of inverter 20, ECU 200 determines that voltage boosting is required. The current limit value of inverter 20 is, for example, a predetermined value and is adapted experimentally or by designing.

When it is determined that voltage boosting is required during driving of vehicle 1, ECU 200 controls one of boost converters CNV1 and CNV2 such that voltage VH is set at a target voltage VHt that is set based on required power Pe. Such control will be hereinafter referred to as voltage control. Also, one of the boost converters that is configured to execute voltage control will be hereinafter referred to as a main converter while the other one of the boost converters that is configured not to execute voltage control will be hereinafter referred to as a sub converter. ECU 200 causes the sub converter to operate as required. When required power Pe cannot be supplied to inverter 20 by the main converter alone, ECU 200 causes the sub converter to operate.

For example, when required power Pe exceeds electric power that can be supplied to inverter 20 from the main converter alone, and when the estimate value of the current flowing through the main converter during supply of required power Pe to the electric load exceeds a limit value, ECU 200 determines that required power Pe cannot be supplied from the main converter alone to inverter 20.

In this case, ECU 200 uses a sub converter to execute power control for supplying electric power to inverter 20 while setting part of required power Pe as target power.

Specifically, ECU 200 controls the sub converter such that the electric power of required power Pe that corresponds to a proportion shown by a predetermined ratio (hereinafter referred to as a distribution ratio) K (=K×Pe) is supplied from the sub converter to inverter 20. The main converter and the sub converter are controlled in this way, so that large electric power can be supplied to inverter 20 by voltage control, and also so that power load can be distributed between two boost converters by power control. Accordingly, the current flowing through the boost converter can be suppressed from exceeding a limit value.

ECU 200 sets, for example, the following control modes to control the main converter and the sub converter.

In other words, when it is determined that voltage boosting is required during driving of vehicle 1, ECU 200 selects, based on required power Pe, one of control modes including: a single voltage boost mode in which the main converter is operated alone; and a double voltage boost mode in which the main converter and the sub converter are operated.

For example, when required power Pe can be supplied from the main converter alone to inverter 20, ECU 200 selects a single voltage boost mode. Furthermore, for example, if the estimate value of the current flowing through the main converter exceeds a current limit value when required power Pe is supplied from the main converter alone to inverter 20, ECU 200 selects a double voltage boost mode. In addition, even if ECU 200 can select a single voltage boost mode, it may select a double voltage boost mode based on losses and the like.

ECU 200 executes voltage control for the main converter when it selects a single voltage boost mode. At this time, ECU 200 controls the other boost converter such that the reactor current is set at zero. In other words, ECU 200 brings each of the switching elements of the other boost converter into an OFF state.

On the other hand, ECU 200 executes voltage control in the main converter also when it selects a double voltage boost mode. At this time, ECU 200 controls the sub converter such that the electric power of required power Pe that corresponds to an amount based on distribution ratio K is supplied from the sub converter to inverter 20.

Distribution ratio K is a value greater than 0 and smaller than 1, and shows the ratio between the electric power supplied to inverter 20 through the sub converter and required power Pe. Distribution ratio K is, for example, calculated from the ratio between the circuit resistances of the main converter and the sub converter. For example, assuming that the circuit resistance value of the main converter is defined as R1 and the circuit resistance value of the sub converter is defined as R2, distribution ratio K is calculated by the equation of K=R1/(R1+R2).

In the double voltage boost mode, the sub converter is controlled such that the electric power in the sub converter is set to be K×Pe with respect to required power Pe required for vehicle 1. More specifically, the operation of the sub converter is controlled such that the value obtained by multiplying current IL2 and voltage VL is set to be distribution power K×Pe. In this way, when the electric power equivalent to required power Pe is supplied to inverter 20, the electric power of (1−K)×Pe is to be supplied from the main converter to inverter 20, and electric power of K×Pe is to be supplied from the sub converter to inverter 20. In the present embodiment, boost converters CNV1 and CNV2 have the same capacity, in which case the distribution ratio is set at 0.5, for example.

Figure 2:
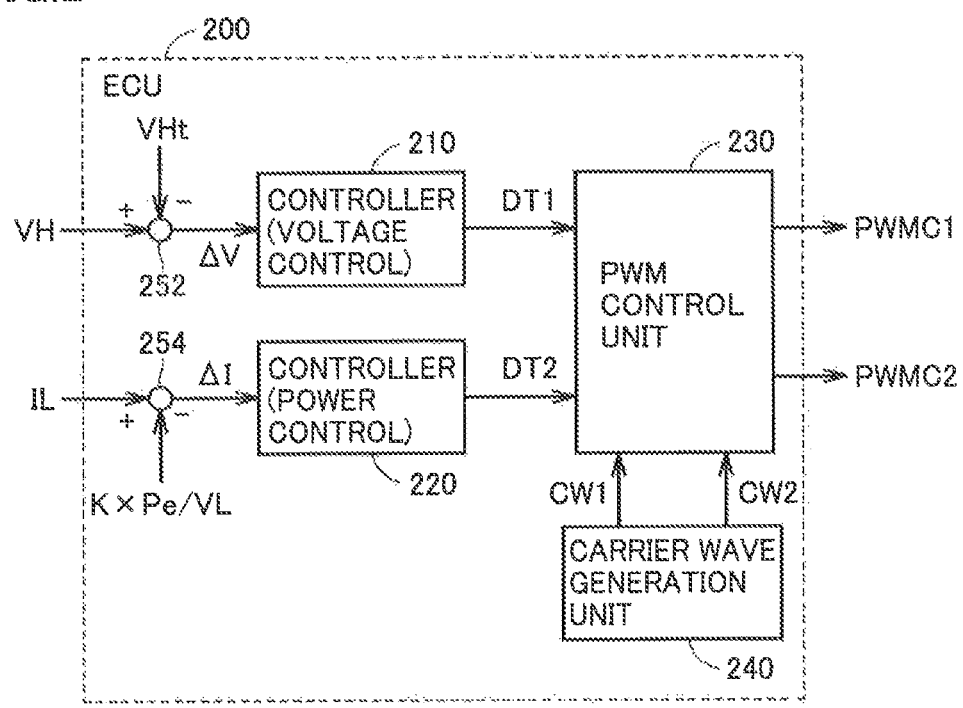
FIG. 2 is a diagram for illustrating voltage control and power control that are executed in two boost converters.

FIG. 2 is a diagram for illustrating voltage control and power control that are executed in two boost converters. In addition, the functional block illustrated in each of FIG. 2 and FIG. 3 described later will be explained as having a function implemented by software processing by ECU 200, but such a function may be implemented, for example, by hardware processing.

In the double voltage boost mode, voltage control is executed to control output voltage VH to compensate for a voltage deviation ΔV from target voltage VHt while power control is executed to control the output power from the sub converter to be set at K×Pe. Also in the present embodiment, power control is implemented by controlling the sub converter such that a reactor current IL of the sub converter is set at K×Pe/VL.

Referring to FIG. 2, ECU 200 includes a first controller 210 configured to control the output from the main converter, a second controller 220 configured to control the output from the sub converter, a PWM control unit 230, a carrier wave generation unit 240, a first subtraction unit 252, and a second subtraction unit 254.

First subtraction unit 252 calculates a voltage deviation ΔV between output voltage VH and target voltage VHt (ΔV=VH−VHt). By conducting feedback control (for example, PI control) for compensating for voltage deviation ΔV, first controller 210 calculates an output duty ratio DT1 of the main converter (which will be simply referred to as a duty ratio DT1).

Second subtraction unit 254 calculates a current deviation ΔI between reactor current IL of the sub converter and a target value K×Pe/VL (ΔI=IL−K×Pe/VL). By conducting feedback control (for example, PI control) for compensating for current deviation ΔI, second controller 220 calculates an output duty ratio DT2 of the sub converter (which will be hereinafter simply referred to as a duty ratio DT2).

Carrier wave generation unit 240 generates a carrier wave CW1 used for controlling the main converter and a carrier wave CW2 used for controlling the sub converter.

PWM control unit 230 generates control signals PWMC1 and PWMC2 by PWM control based on duty ratio DT1 and carrier wave CW1, and by PWM control based on duty ratio DT2 and carrier wave CW2, respectively.

For example, when boost converter CNV1 serves as a main converter, PWM control unit 230 generates control signal PWMC1 by PWM control based on duty ratio DT1 and carrier wave CW1, and also generates control signal PWMC2 by PWM control based on duty ratio DT2 and carrier wave CW2.

On the other hand, for example, when boost converter CNV2 serves as a main converter, PWM control unit 230 generates control signal PWMC2 by PWM control based on duty ratio DT1 and carrier wave CW1, and also generates control signal PWMC1 by PWM control based on duty ratio DT2 and carrier wave CW2.

For example, it is assumed that the main converter is fixed as one of boost converters CNV1 and CNV2 when the operation as described above is performed. In this case, even if any one of the single voltage boost mode and the double voltage boost mode is selected, the main converter serving to execute voltage control is to operate continuously when the voltage is boosted to a target voltage. Accordingly, the operation time period of the main converter may be increased as compared with that of the sub converter that operates as required when the double voltage boost mode is selected. Thus, stresses upon components (for example, a switching element) and the like are accumulated more in the main converter than in the sub converter, with the result that the main converter may deteriorate earlier than the sub converter.

Accordingly, in the present embodiment, ECU 200 is configured to perform the following operations.

Specifically, ECU 200 calculates: a first stress value Va that quantitatively shows a stress caused by the voltage boosting operation of boost converter CNV1 and accumulated in components included in boost converter CNV1; and a second stress value Vb that quantitatively shows a stress caused by the voltage boosting operation of boost converter CNV2 and accumulated in components included in boost converter CNV2.

When first stress value Va is less than second stress value Vb, ECU 200 uses boost converter CNV1 to execute the above-described voltage control (that is, sets boost converter CNV1 as a main converter), and also, uses boost converter CNV2 to execute the above-described power control (that is, sets boost converter CNV2 as a sub converter).

On the other hand, when second stress value Vb is less than first stress value Va, ECU 200 uses boost converter CNV2 to execute the above-described voltage control (that is, sets boost converter CNV2 as a main converter), and uses boost converter CNV1 to execute the above-described power control (that is, sets boost converter CNV1 as a sub converter).

In this way, since the boost converter with a smaller stress value is used for voltage control, accumulation of stresses can be distributed equally between boost converter CNV1 and boost converter CNV2. Consequently, it becomes possible to suppress deterioration from occurring earlier in one boost converter than in the other boost converter.

Figure 3:
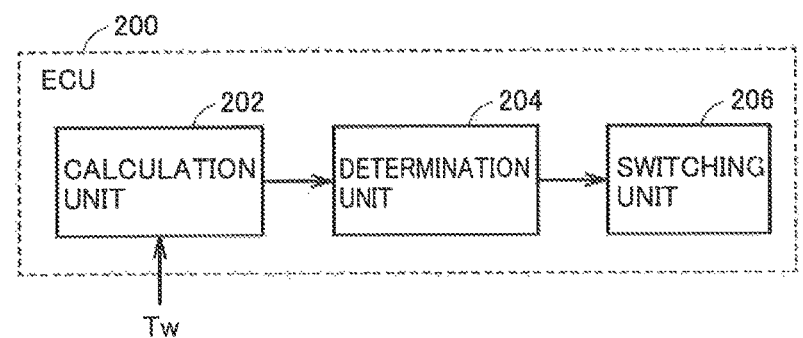
FIG. 3 is a functional block diagram of an ECU 200 related to a controlling process for switching the boost converters based on a stress value.

FIG. 3 is a functional block diagram of ECU 200 related to a controlling process for switching the boost converters based on a stress value.

As shown in FIG. 3, ECU 200 includes a calculation unit 202, a determination unit 204, and a switching unit 206.

Calculation unit 202 is configured to calculate first stress value Va and second stress value Vb. For example, calculation unit 202 calculates, as first stress value Va, the integrated value of the number of times that a temperature difference Ts−Tw between an element temperature Ts of boost converter CNV1 and a cooling water temperature Tw shows a temperature sudden change state. The temperature sudden change state means the state where, after temperature difference Ts−Tw becomes greater than a threshold value A, temperature difference Ts−Tw becomes less than a threshold value B in a time period from when temperature difference Ts−Tw becomes equal to or less than threshold value A until a lapse of a predetermined time period. First stress value Va is assumed to be a total value summed since vehicle 1 has been manufactured. Element temperature Ts may be detected using a temperature sensor, or may be estimated based on the operating time periods of switching elements Q1 and Q2, the magnitude of the current and the like. It is to be noted that the method of calculating second stress value Vb is the same as the method of calculating first stress value Va. The detailed description of the method of calculating a stress value will be described later.

Determination unit 204 determines whether or not boost converter CNV1 is set as a boost converter by which voltage control is executed (a main converter). In other words, determination unit 204 determines whether boost converter CNV1 is set as a main converter or boost converter CNV2 is set as a main converter.

If determination unit 204 determines that boost converter CNV1 is set as a main converter, it determines whether first stress value Va is greater than second stress value Vb or not.

On the other hand, if determination unit 204 determines that boost converter CNV1 is not set as a main converter, it determines whether second stress value Vb is greater than first stress value Va or not.

If determination unit 204 determines that boost converter CNV1 is set as a present main converter and also determines that first stress value Va is greater than second stress value Vb, switching unit 206 switches the main converter from boost converter CNV1 to boost converter CNV2. In this case, switching unit 206 further switches the boost converter executing power control (a sub converter) from boost converter CNV2 to boost converter CNV1.

In the present embodiment, for example, at restart of the voltage boosting operation such as after voltage VH has reached target voltage VHt or after regenerative brake has been applied, switching unit 206 switches between the boost converter used for voltage control and the boost converter used for power control.

On the other hand, when it is determined that boost converter CNV1 is not set as a present main converter, and also determined that second stress value Vb is greater than first stress value Va, switching unit 206 switches the main converter from boost converter CNV2 to boost converter CNV1. In this case, switching unit 206 further switches the sub converter from boost converter CNV1 to boost converter CNV2.

In addition, when boost converter CNV1 is set as a main converter, and when first stress value Va is equal to or less than second stress value Vb, switching unit 206 maintains the relation between the main converter and the sub converter without switching therebetween. Alternatively, when boost converter CNV2 is set as a main converter, and when second stress value Vb is equal to or less than first stress value Va, switching unit 206 maintains the relation between the main converter and the sub converter without switching therebetween.

The method of calculating a stress value as described above will be hereinafter described in detail with reference to FIGS. 4 and 5. Although an example of the method of calculating first stress value Va is illustrated with reference to FIGS. 4 and 5, the method of calculating second stress value Vb is also the same. Accordingly, the detailed description thereof will not be repeated.

Figure 4:
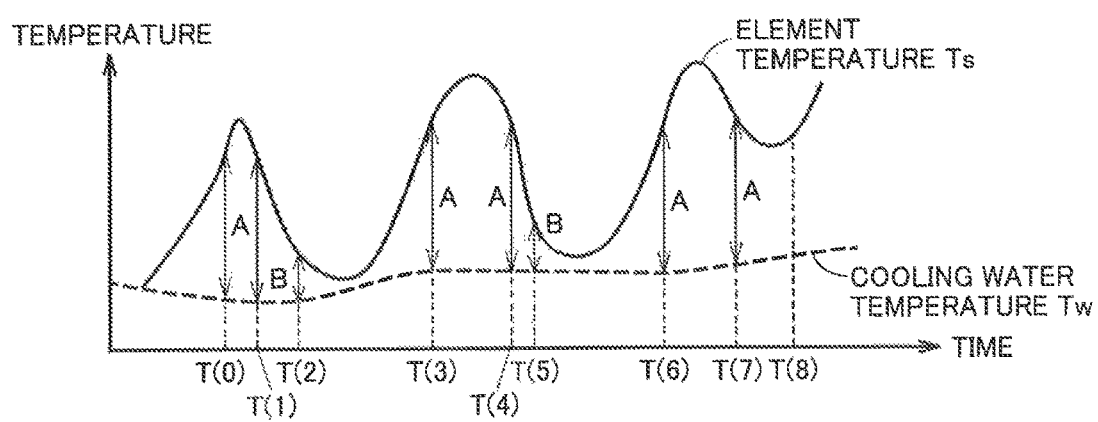
FIG. 4 is a diagram for illustrating a method of calculating a stress value.

FIG. 4 shows changes of element temperature Ts and cooling water temperature Tw during driving of vehicle 1. In FIG. 4, the vertical axis shows element temperature Ts or cooling water temperature Tw while the horizontal axis shows time. The line graph shown by a solid line in FIG. 4 illustrates a change of element temperature Ts of each of switching elements Q1 and Q2 in boost converter CNV1. The line graph shown by a dashed line in FIG. 4 illustrates a change of cooling water temperature Tw.

As described above, the integrated value of the number of times that temperature difference Ts−Tw between element temperature Ts of boost converter CNV1 and cooling water temperature Tw shows a temperature sudden change state is calculated as first stress value Va.

When a request to accelerate vehicle 1 or the like is made to increase required power Pe to thereby increase the target voltage during voltage boosting, the current flowing through the switching element in boost converter CNV1 is increased, with the result that element temperature Ts rises.

It is determined that temperature difference Ts−Tw is greater than threshold value A at time T(0). Then, when a request to accelerate vehicle 1 or the like is not made to decrease required power Pe to thereby decrease the target voltage during voltage boosting, the current flowing through the switching element in boost converter CNV1 is decreased, with the result that element temperature Ts falls.

When it is determined that temperature difference Ts−Tw is less than threshold value B at time T(2) that is within a predetermined time elapsed since time T(1) at which temperature difference Ts−Tw becomes equal to or less than threshold value A, it is determined that the temperature sudden change state occurs, and then, "1" is added to first stress value Va.

Similarly, element temperature Ts is again changed by the operation of boost converter CNV1 for the subsequent increase or decrease in the required power, and temperature difference Ts−Tw becomes greater than threshold value A at time T(3). Then, temperature difference Ts−Tw changes to be less than threshold value B at time T(5) that is within a predetermined time elapsed since time T(4) at which temperature difference Ts−Tw becomes equal to or less than threshold value A. At this time, it is determined that the temperature sudden change state occurs again, and then, "1" is further added to first stress value Va.

In addition, no addition is made to first stress value Va if temperature difference Ts−Tw becomes greater than threshold value A at time T(6), and if temperature difference Ts−Tw does not become less than threshold value B during a time period from time T(7) at which temperature difference Ts−Tw becomes equal to or less than threshold value A until time T(8) at which a predetermined time has elapsed.

Figure 5:
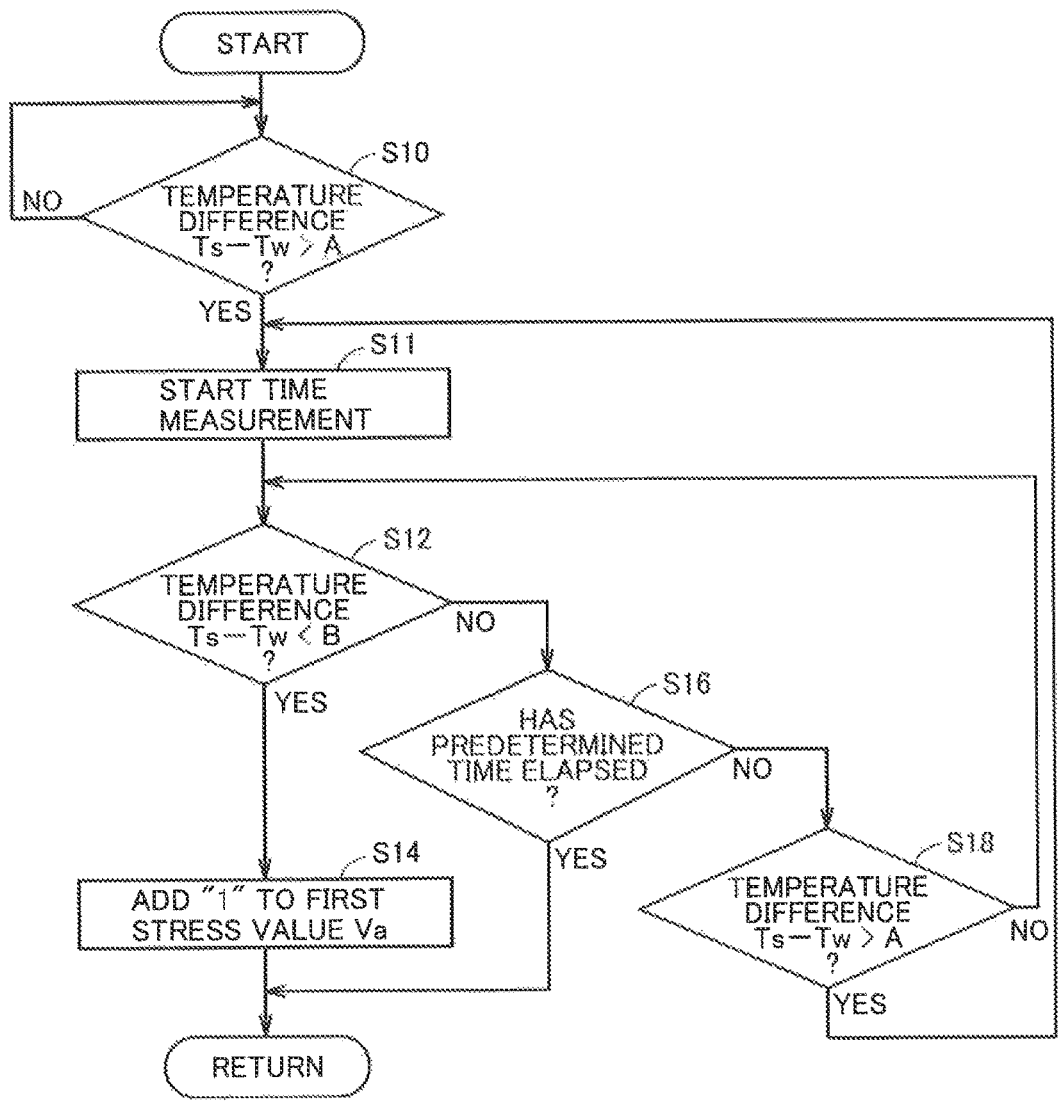
FIG. 5 is a flowchart illustrating an example of the controlling process for calculating a first stress value Va.

FIG. 5 is a flowchart illustrating an example of a controlling process for calculating first stress value Va. This flowchart is repeatedly performed in a prescribed period.

In step (which will be hereinafter abbreviated as S) 10, ECU 200 determines whether temperature difference Ts−Tw between element temperature Ts of boost converter CNV1 and cooling water temperature Tw is greater than threshold value A or not. By this process, it is determined whether the temperature difference between element temperature Ts and cooling water temperature Tw has been increased or not. If it is determined that temperature difference Ts−Tw is greater than threshold value A (YES in S10), ECU 200 cause the process to proceed to S11.

In S11, ECU 200 starts time measurement. In S12, ECU 200 determines whether temperature difference Ts−Tw between element temperature Ts and cooling water temperature Tw is less than threshold value B. By this process, it is determined whether the temperature difference between element temperature Ts and cooling water temperature Tw is decreased or not. If it is determined that temperature difference Ts−Tw is less than threshold value B (YES in S12), ECU 200 causes the process to proceed to S14. In S14, ECU 200 adds "1" to first stress value Va.

Then, it is determined whether temperature difference Ts−Tw is greater than threshold value A or not (S10). In this case, if it is determined that temperature difference Ts−Tw is equal to or less than threshold value A (NO in S10), the process is returned to S10.

Also it is determined whether temperature difference Ts−Tw is less than threshold value B or not (S12). In this case, if it is determined that temperature difference Ts−Tw is equal to or greater than threshold value B (NO in S12), ECU 200 determines in S16 whether the predetermined time has elapsed or not since the time measurement has been started in S11.

The predetermined time is used for determining that the temperature gradually changes and the temperature sudden change state does not occur. Also, this predetermined time is adapted in advance by experiments and the like. If it is determined that the predetermined time has elapsed (YES in S16), this process is ended. If not (NO in S16), the process proceeds to S18.

In S18, ECU 200 determines whether temperature difference Ts−Tw is greater than threshold value A or not. If temperature difference Ts−Tw is greater than threshold value A (YES in S18), ECU 200 causes the process to proceed to S11 for starting time measurement again. If temperature difference Ts−Tw is equal to or less than threshold value A (NO in S18), the process is returned to S12 for determining again whether a temperature sudden change state occurs or not.

Figure 6:
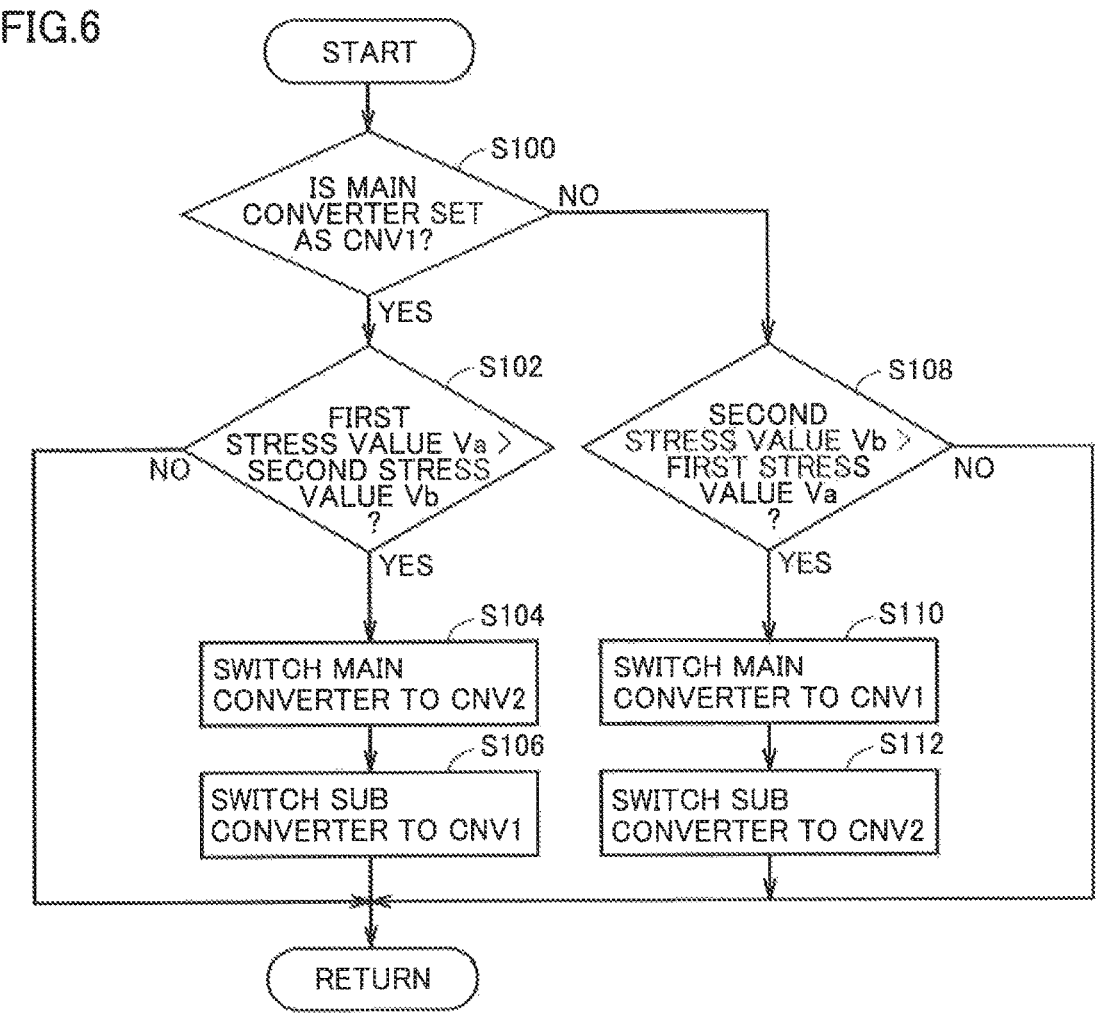
FIG. 6 is a flowchart illustrating an example of the controlling process for switching the boost converters based on the stress value in the first embodiment.

FIG. 6 is a flowchart illustrating an example of the controlling process for switching the boost converters based on the stress value in the first embodiment. This flowchart is repeatedly performed in a prescribed period Ta. It is desirable that prescribed period Ta is set such that switching between the main converter and the sub converter is not frequently performed.

In S100, ECU 200 determines whether boost converter CNV1 is set as a present main converter or not. If it is determined that boost converter CNV1 is set as a present main converter (YES in S100), the process proceeds to S102.

For determination about a main converter as described above, ECU 200 uses a flag set to be an ON state, for example, each time the main convert is switched to boost converter CNV1. For example, if the flag is set to be an ON state, ECU 200 determines that boost converter CNV1 is set as a main converter. If the flag is set to be an OFF state, ECU 200 determines that boost converter CNV1 is not set as a main converter, that is, boost converter CNV2 is set as a main converter.

In S102, ECU 200 determines whether first stress value Va is greater than second stress value Vb or not. It is determined by this process whether or not stresses are accumulated more in boost converter CNV1 than in boost converter CNV2. If ECU 200 determines that first stress value Va is greater than second stress value Vb (YES in S102), it proceeds the process to S104.

In S104, ECU 200 switches the main converter from boost converter CNV1 to boost converter CNV2. In S106, ECU 200 switches the sub converter from boost converter CNV2 to boost converter CNV1.

In addition, if it is determined that first stress value Va is equal to or less than second stress value Vb (NO in S102), ECU 200 ends this process.

On the other hand, in S100, if it is determined that boost converter CNV1 is not set as a present main converter, that is, if it is determined that boost converter CNV2 is set as a present main converter (NO in S100), the process proceeds to S108.

In S108, ECU 200 determines whether second stress value Vb is greater than first stress value Va. By this process, it is determined whether or not stresses are accumulated more in boost converter CNV2 than in boost converter CNV1. If ECU 200 determines that second stress value Vb is greater than first stress value Va (YES in S108), it proceeds the process to S110.

In S110, ECU 200 switches the main converter from boost converter CNV2 to boost converter CNV1. In S112, ECU 200 switches the sub converter from boost converter CNV1 to boost converter CNV2.

In addition, if it is determined that second stress value Vb is equal to or less than first stress value Va (NO in S108), ECU 200 ends this process.

Figure 7:
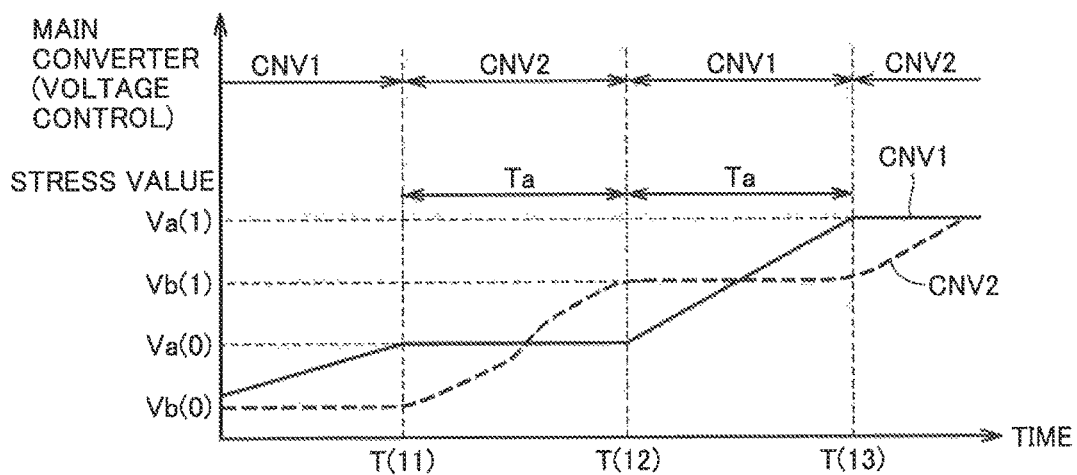
FIG. 7 is a timing chart for illustrating the operation of an ECU in the first embodiment.

Referring to FIG. 7, an explanation will be hereinafter given with regard to the operation of ECU 200 included in power supply device 2 according to the present embodiment based on the above-described structures and flowcharts.

FIG. 7 shows changes of first stress value Va and second stress value Vb. In FIG. 7, the vertical axis shows a stress value while the horizontal axis shows time. In addition, the timing at which first stress value Va and second stress value Vb are compared is not necessarily the same as the timing at which the main converter and the sub converter are switched. For convenience of explanation, however, both of the timings are assumed to be the same in the description with reference to FIG. 7.

For example, it is assumed that boost converter CNV1 is set as a present main converter while boost converter CNV2 is set as a sub converter. Also, first stress value Va is assumed to be greater than second stress value Vb.

For example, the single voltage boost mode is selected if the current, which flows through the main converter during supply of required power Pe from the main converter to inverter 20, does not exceed a limit value.

If the single voltage boost mode is selected, switching elements Q3 and Q4 in boost converter CNV2 serving as a sub converter each are maintained in a shut-off state. Accordingly, second stress value Vb does not increase from Vb(0). On the other hand, boost converter CNV1 performs a voltage boosting operation as a main converter. Thus, first stress value Va is to increase each time temperature difference Ts–Tw shows a temperature sudden change state.

When the controlling process shown in FIG. 6 is executed at time (11), boost converter CNV1 is set as a main converter (YES in S100). Thus, if it is determined that first stress value Va(0) is greater than second stress value Vb(0) (YES in S102), the main converter is switched from boost converter CNV1 to boost converter CNV2 (S104). Furthermore, the sub converter is switched from boost converter CNV2 to boost converter CNV1 (S106). It is to be noted that the above-described switching is performed at the time when the voltage boosting operation is restarted as described above.

After the main converter has been switched to boost converter CNV2, switching elements Q1 and Q2 in boost converter CNV1 each are maintained in a shut-off state. Thus, first stress value Va does not increase from Va(0). On the other hand, boost converter CNV2 performs a voltage boosting operation as a main converter. Thus, second stress value Vb is to increase each time temperature difference Ts–Tw shows a temperature sudden change state.

The controlling process shown in FIG. 6 is executed again at time T(12) at which a prescribed period Ta has elapsed since time T(11). At this time, boost converter CNV2 is set as a main converter (NO in S100). Thus, if it is determined that second stress value Vb(1) is greater than first stress value Va(0) (YES in S108), the main converter is switched from boost converter CNV2 to boost converter CNV1 (S110). Furthermore, the sub converter is switched from boost converter CNV1 to boost converter CNV2 (S112).

Then, the controlling process shown in FIG. 6 is executed again at time T(13) at which a prescribed period Ta has further elapsed since time T(12). At this time, boost converter CNV1 is set as a main converter (YES in S100). Thus, if it is determined that first stress value Va(1) is greater than second stress value Vb(1) (YES in S102), the main converter is switched from boost converter CNV1 to boost converter CNV2 (S104). Furthermore, the sub converter is switched from boost converter CNV2 to boost converter CNV1 (S106).

In addition, the above description has been made by way of example with regard to the case where the single voltage boost mode is continuously selected, which is however different from the case where the double voltage boost mode is continuously selected, in which the stress value of the main converter increases while the stress value of the sub converter also increases. However, in both of these cases, the converter having a lower stress value is likewise set as a main converter. Accordingly, the detailed description thereof will not be repeated.

As described above, in the power supply device according to the present embodiment, the boost converter having a smaller stress value is used for voltage control, so that accumulation of stresses can be distributed between boost converters CNV1 and CNV2. Consequently, deterioration can be suppressed from occurring earlier in one boost converter than in the other boost converter. Therefore, it becomes possible to provide a power supply device capable of suppressing unbalanced deterioration from occurring among a plurality of boost converters.

Boost converters CNV1 and CNV2 are configured to have the same capacity, thereby eliminating the need to change a control command value and the like in each control including voltage control and power control in the voltage boosting operation before and after switching the converters, so that smooth switching can be realized.

Furthermore, a change in voltage VH may be delayed, for example, because capacitor C2 is charged/discharged in accordance with changes in the current. Accordingly, the convergence to a target value in power control is higher than the convergence to a target value in voltage control. Thus, the output power from the sub converter is to be stabilized, and the fluctuation by disturbance or the like is to be absorbed by the main converter. Therefore, generation of stresses in the sub converter can be suppressed. Consequently, the converter having a smaller stress value is set as a main converter, so that accumulation of stresses can be distributed between the main converter and the sub converter.

Then, a modification will be hereinafter described.

Although an explanation has been given by way of example in the above-described embodiment with regard to the case where the present invention is applied to hybrid vehicle 1 shown in FIG. 1, the vehicle to which the present invention is applicable is not limited to a hybrid vehicle, but may for example be an electrically powered vehicle having no engine.

Although an explanation has been given by way of example in the above-described embodiment with regard to the case where vehicle 1 is equipped with battery 70, but battery 70 may be a power storage device other than a secondary battery. For example, a capacitor may be employed in place of a secondary battery.

In the above-described embodiment, an explanation has been given with regard to the case where the stress values accumulated in the components included in the boost converter during driving of vehicle 1 are compared with one another, and the boost converters are switched at restart of the voltage boosting operation. However, for example, the stress values may be compared with one another when vehicle 1 is in a travel preparing state before a travel allowable state. Then, the boost converters may be switched according to the comparison result, and after that, vehicle 1 may be brought into a travel allowable state.

In the above-described embodiment, an explanation has been given with regard to the case where the integrated value of the number of times that temperature difference Ts–Tw between element temperature Ts and cooling water temperature Tw shows a sudden change state is calculated as a stress value. However, for example, the integrated value of the number of times that the temperature difference between element temperature Ts and the ambient temperature within the engine room in place of cooling water temperature Tw shows a sudden change state is calculated as a stress value.

In the above-described embodiment, an explanation has been given with regard to the case where the integrated value of the number of times that temperature difference Ts–Tw between element temperature Ts and cooling water temperature Tw shows a sudden change state is calculated as a stress value. However, the stress value is not limited to the integrated value of the number of times that temperature difference Ts–Tw shows a sudden change state. For example, the stress value may be calculated based on at least one of: the number of times that the temperature of the switching element suddenly changes during the voltage boosting operation; the duration time of the voltage boosting operation; the traveling distance of the vehicle in the state where a boost converter is used for voltage control; and the number of times of startup of the vehicle in the state where a boost converter is used for voltage control.

Although an explanation has been given in the above-described embodiment with regard to the case where a stress value is a total value summed since vehicle 1 has been manufactured, the stress value may be reset to an initial value (for example, zero), for example, each time vehicle 1 is started up.

In the above-described embodiment, an explanation has been given with regard to the case where switching between the boost converter used for voltage control and the boost converter used for power control is performed at the timing at which the voltage boosting operation is restarted after voltage VH has reached target voltage VHt. However, the switching timing is not limited to the above-described timing. For example, switching may be performed at startup of vehicle 1. Alternatively, voltage control and power control may be switched gradually while maintaining the power distribution ratio. For example, the control command value of the sub converter may be changed to a value corresponding to the control command value of the main converter, and after that, the control command value of the main converter may be changed to a value corresponding to the control command value of the sub converter before change.

In the above-described embodiment, an explanation has been given with regard to the case where boost converters CNV1 and CNV2 have the same capacity, but may have different capacities, for example. In this case, the current limit values in the main converter and the sub converter change before and after switching. Accordingly, it is desirable to change, based on the current limit values after change, the distribution ratio and the control command value in each control including voltage control and power control during the voltage boosting operation.

In addition, the above-described modification may be implemented in combination of all or part thereof.

Second Embodiment

A power supply device according to the second embodiment will be hereinafter described. A power supply device 2 according to the present embodiment is different from power supply device 2 according to the above-described first embodiment with regard to the operation of ECU 200, particularly, with regard to the operations of determination unit 204 and switching unit 206 in the functional block diagram shown in FIG. 3. The configurations other than those described above are the same as those of power supply device 2 according to the above-described first embodiment. Thus, the reference characters thereof are also the same. Functions thereof are also the same. Accordingly, the detailed description thereof will not be repeated.

In the above-described first embodiment, an explanation has been given with regard to the case where the controlling process shown in FIG. 6 is performed each time prescribed period Ta has elapsed. However, if this prescribed period Ta is set to be long, stresses may be unable to be distributed appropriately between boost converters CNV1 and CNV2 when an operation that causes a sudden increase of a stress value is performed in a short term period. Accordingly, prescribed period Ta is preferably short. On the other hand, if this prescribed period Ta is set to be short, frequent switching may occur between the boost converter by which voltage control is executed and the boost converter by which power control is executed.

Accordingly, in the present embodiment, switching between the main converter and the sub converter is inhibited until a certain degree of difference is produced between the stress value of the main converter and the stress value of the sub converter, thereby preventing occurrence of frequent switching. Specifically, even if second stress value Vb is greater than first stress value Va, but when the magnitude of the difference between first stress value Va and second stress value Vb is less than a threshold value α (which will be hereinafter also referred to as a margin α), ECU 200 performs no switching from voltage control using boost converter CNV2 to voltage control using boost converter CNV1.

Furthermore, even if first stress value Va is greater than second stress value Vb, but when the magnitude of the difference between first stress value Va and second stress value Vb is less than margin α, ECU 200 performs no switching from voltage control using boost converter CNV1 to voltage control using boost converter CNV2.

In the present embodiment, margin α is a predetermined value. Margin α is a value set so as to prevent frequent switching from occurring between the boost converter by which voltage control is executed and the boost converter by which power control is executed. Also, this margin α is adapted by experiments and the like.

Figure 8:
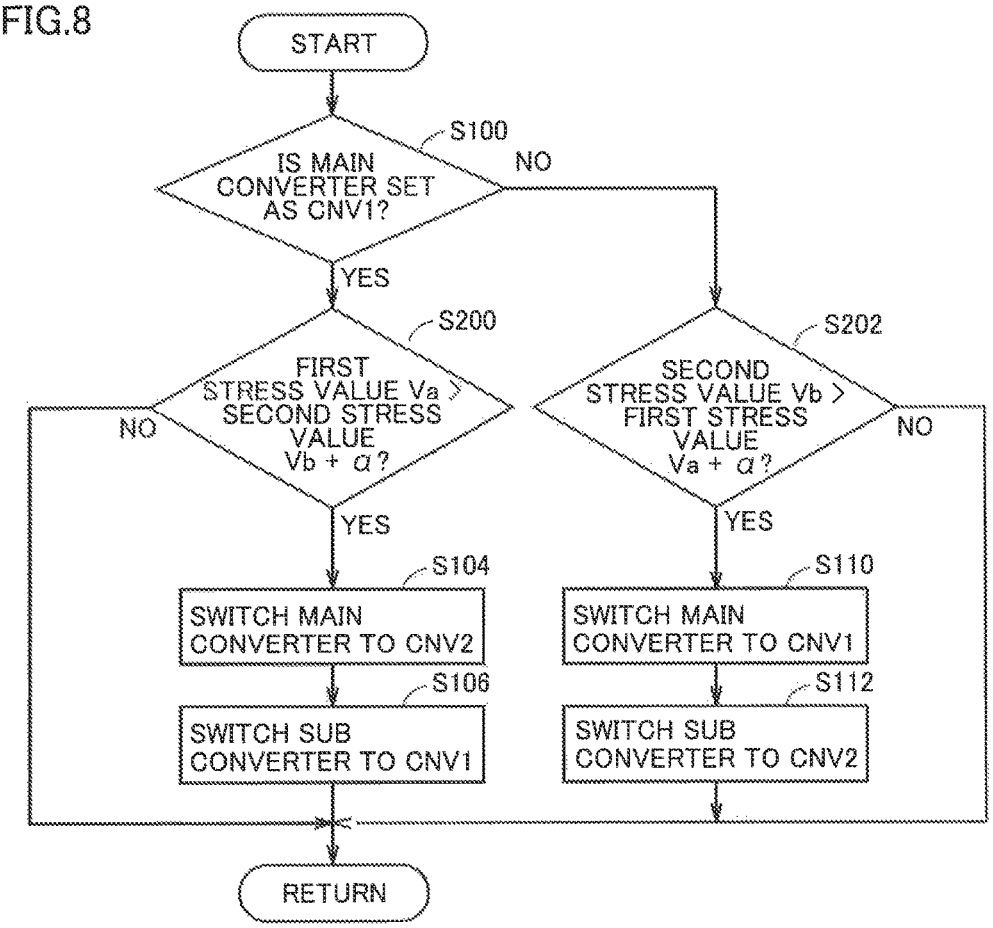
FIG. 8 is a flowchart illustrating an example of the controlling process for switching boost converters based on a stress value in the second embodiment.

FIG. 8 is a flowchart illustrating an example of the controlling process for switching the boost converters based on a stress value in the second embodiment. This flowchart is repeatedly performed in a prescribed period.

In addition, the process in S100, S104, S106, S110, and S112 in the flowchart in FIG. 8 is the same as the process in S100, S104, S106, S110, and S112 in the flowchart in FIG. 6. Thus, the detailed description thereof will not be repeated.

If it is determined that boost converter CNV1 is set as a main converter (YES in S100), ECU 200 determines in S200 whether first stress value Va is greater than the value obtained by adding margin α to second stress value Vb or not. If it is determined that first stress value Va is greater than the value obtained by adding margin α to second stress value Vb (YES in S200), the process proceeds to S104. If not (NO in S200), this process is ended.

If it is determined that boost converter CNV1 is not set as a main converter (NO in S100), that is, if it is determined that boost converter CNV2 is set as a main converter, ECU 200 determines in S202 whether second stress value Vb is greater than the value obtained by adding margin α to first stress value Va. If it is determined that second stress value Vb is greater than the value obtained by adding margin α to first stress value Va (YES in S202), the process proceeds to S110. If not (NO in S202), this process is ended.

Figure 9:
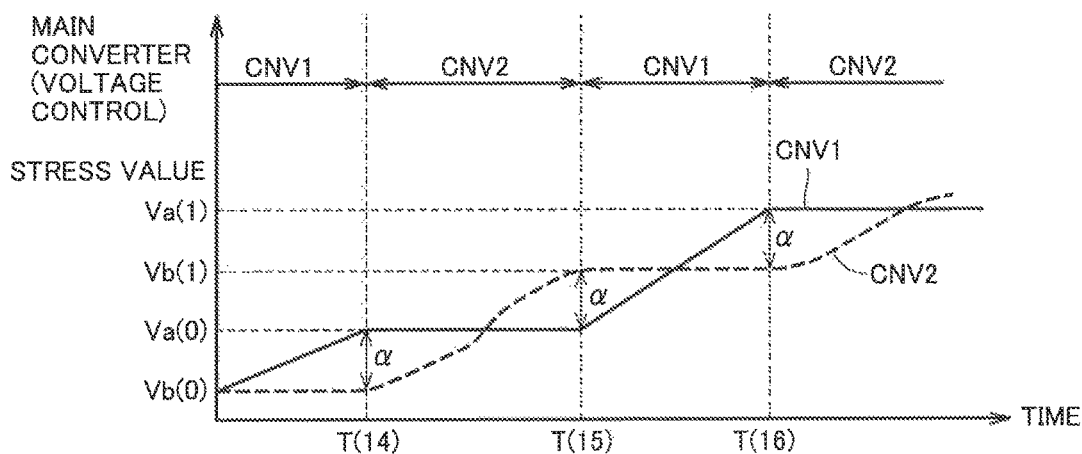
FIG. 9 is a timing chart for illustrating the operation of an ECU in the second embodiment.

With reference to FIG. 9, an explanation will be hereinafter given with regard to the operation of ECU 200 included in power supply device 2 according to the present embodiment based on the above-described structures and flowcharts.

FIG. 9 shows changes of first stress value Va and second stress value Vb. In FIG. 9, the vertical axis shows a stress value while the horizontal axis shows time. In addition, the timing at which first stress value Va and second stress value Vb are compared is not necessarily the same as the timing at which the main converter and the sub converter are switched. For convenience of explanation, however, both of the timings are assumed to be the same in the description with reference to FIG. 9.

For example, it is assumed that boost converter CNV1 is set as a main converter and boost converter CNV2 is set as a sub converter.

For example, when the single voltage boost mode is selected, each of switching elements Q3 and Q4 in boost converter CNV2 is maintained in a shut-off state, with the result that second stress value Vb does not increase from Vb(0). On the other hand, since boost converter CNV1 performs a voltage boosting operation as a main converter, first stress value Va is to increase each time temperature difference Ts−Tw shows a temperature sudden change state.

At time (14), boost converter CNV1 is set as a main converter (YES in S100). Accordingly, if it is determined that first stress value Va(0) is greater than the value obtained by adding margin α to second stress value Vb(0) (YES in S200), the main converter is switched from boost converter CNV1 to boost converter CNV2 (S104). Furthermore, the sub converter is switched from boost converter CNV2 to boost converter CNV1 (S106).

After the main converter is switched to boost converter CNV1, each of switching elements Q1 and Q2 in boost converter CNV1 is maintained in a shut-off state. Thus, first stress value Va does not increase from Va(0). On the other hand, boost converter CNV2 performs a voltage boosting operation as a main converter. Thus, second stress value Vb is to increase each time temperature difference Ts−Tw shows a temperature sudden change state.

Boost converter CNV2 is set as a main converter at time T(15) (NO in S100). Thus, if it is determined that second stress value Vb(1) is greater than the value obtained by adding margin α to first stress value Va(0) (YES in S202), the main converter is switched from boost converter CNV2 to boost converter CNV1 (S110). Furthermore, the sub converter is switched from boost converter CNV1 to boost converter CNV2 (S112).

Then, boost converter CNV1 is set as a main converter at time T(16) (YES in S100). Thus, if it is determined that first stress value Va(1) is greater than the value obtained by adding margin α to second stress value Vb(l) (YES in S200), the main converter is switched from boost converter CNV1 to boost converter CNV2 (S104). Furthermore, the sub converter is switched from boost converter CNV2 to boost converter CNV1 (S106).

As described above, in the power supply device according to the present embodiment, voltage control is executed using a boost converter having a smaller stress value that quantitatively shows stresses accumulated in components of the boost converter, as having been described in the above-described first embodiment. Thus, accumulation of stresses can be equally distributed between boost converters CNV1 and CNV2. Accordingly, deterioration can be suppressed from occurring earlier in one boost converter than in the other boost converter. Therefore, it becomes possible to provide a power supply device capable of suppressing unbalanced deterioration from occurring among a plurality of boost converters.

Furthermore, even if second stress value Vb is greater than first stress value Va, but when the magnitude of the difference between first stress value Va and second stress value Vb is less than margin α, no switching is performed from the voltage control using boost converter CNV2 to the voltage control using boost converter CNV1. Furthermore, even if first stress value Va is greater than second stress value Vb, but when the magnitude of the difference between first stress value Va and second stress value Vb is less than threshold value α, no switching is performed from the voltage control using boost converter CNV1 to the voltage control using boost converter CNV2. Accordingly, frequent switching can be suppressed from occurring between the boost converter executing voltage control and the boost converter executing power control.

In addition, margin α has been explained as a predetermined value in the above-described embodiment, but may be changed in accordance with an increase in a stress value. For example, margin α may be set to be decreased in accordance with an increase in at least one of stress values in boost converters CNV1 and CNV2. In this way, stresses can be more equally distributed in accordance with progress of deterioration. Thus, shortening of the boost converter's life can be suppressed. Alternatively, if the capacity or the tolerance is different between boost converters CNV1 and CNV2, margin α may be set to have different values depending on whether the main converter is boost converter CNV1 or boost converter CNV2.

In the above-described embodiment, an explanation has been given with regard to the case where switching is performed between the boost converter executing voltage control and the boost converter executing power control based on the result of comparison between margin α and the magnitude of the difference between first stress value Va and second stress value Vb. However, for example, if the main converter is boost converter CNV1, the main converter may be switched from boost converter CNV1 to boost converter CNV2 at the time when first stress value Va is increased by a predetermined value. Alternatively, if the main converter is boost converter CNV2, the main converter may be switched from boost converter CNV1 to boost converter CNV2 at the time when second stress value Vb is increased by a predetermined value.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A power supply device comprising:
   a first boost converter electrically connected to an electric load;
   a second boost converter electrically connected to the electric load and connected in parallel with the first boost converter to the electric load;
   a power storage device connected in common to the first boost converter and the second boost converter; and
   a controller configured to (i) use the first boost converter to execute voltage control and (ii) use the second boost converter to execute power control, the voltage control being executed for performing a voltage boosting operation such that a voltage to be applied to the electric load is set at a target voltage, and the power control being executed for, when required power required at least for the electric load cannot be supplied to the electric load from only a single boost converter executing the voltage control, supplying electric power to the electric load while setting part of the required power as a target power,
   the controller being configured to calculate a first stress value and a second stress value, the first stress value quantitatively showing a stress that is caused by the voltage boosting operation of the first boost converter and that is accumulated in a component included in the first boost converter, the second stress value quantitatively showing a stress that is caused by the voltage boosting operation of the second boost converter and that is accumulated in a component included in the second boost converter, when the first stress value is greater than the second stress value, use the second boost converter to execute the voltage control and use the first boost converter to execute the power control, perform no switching from the voltage control using the first boost converter to the voltage control using the second boost converter when a magnitude of a difference between the first stress value and the second stress value is less than a threshold value even if the first stress value is greater than the second stress value, and set the threshold value to be smaller as at least any one of the first stress value and the second stress value is larger.

2. The power supply device according to claim 1, wherein the power supply device is mounted on a vehicle, and each of the first stress value and the second stress value is calculated based on at least one of:

(i) the number of times of a sudden change in a temperature of a switching element during the voltage boosting operation;

(ii) a duration time of the voltage boosting operation;

(iii) a traveling distance of the vehicle during the voltage control; and (iv) the number of times of startup of the vehicle during the voltage control.

3. The power supply device according to claim 1, wherein the controller performs switching between the converter used in the voltage control and the converter used in the power control at a start up of a vehicle.

* * * * *